United States Patent
Mou

(10) Patent No.: US 10,580,114 B2
(45) Date of Patent: Mar. 3, 2020

(54) METHODS AND SYSTEMS FOR REAL TIME 3D-SPACE SEARCH AND POINT-CLOUD REGISTRATION USING A DIMENSION-SHUFFLE TRANSFORM

(71) Applicant: Zhijing George Mou, Seattle, WA (US)

(72) Inventor: Zhijing George Mou, Seattle, WA (US)

(*) Notice: Subject to any disclaimer, the term of this patent is extended or adjusted under 35 U.S.C. 154(b) by 0 days.

(21) Appl. No.: 15/940,789

(22) Filed: Mar. 29, 2018

(65) Prior Publication Data
US 2019/0130525 A1    May 2, 2019

Related U.S. Application Data

(60) Provisional application No. 62/478,442, filed on Mar. 29, 2017.

(51) Int. Cl.
*G06T 3/00* (2006.01)
*H04N 19/00* (2014.01)
*G06T 9/00* (2006.01)

(52) U.S. Cl.
CPC .......... *G06T 3/0012* (2013.01); *G06T 3/0031* (2013.01); *G06T 9/00* (2013.01); *H04N 19/00* (2013.01)

(58) Field of Classification Search
None
See application file for complete search history.

(56) References Cited

U.S. PATENT DOCUMENTS

| 8,510,310 B2 | 8/2013 | Mou |
| 9,530,225 B1 | 12/2016 | Nieves |
| 2010/0174721 A1* | 7/2010 | Mou ............... G06F 16/2448 707/741 |
| 2011/0010400 A1 | 1/2011 | Hayes |
| 2013/0230206 A1 | 9/2013 | Mendez-Rodriguez et al. |

(Continued)

OTHER PUBLICATIONS

Anis, Aamir, et al., "Compression of Dynamic 3D Point Clouds using Subdivisional Meshes and Graph Wavelet Transforms," 2016 IEEE International Conference on Acoustics, Speech and Signal Processing (ICASSP), Mar. 20-25, 2016, pp. 1-5.

(Continued)

*Primary Examiner* — Nurun N Flora
(74) *Attorney, Agent, or Firm* — Olympic Patent Works PLLC

(57) ABSTRACT

The current document is directed to a dimensional shuffle transform ("DST") that maps a 3D space to a one-dimensional space that preserves 3D neighborhoods within 1D neighborhoods within a recursive hierarchical structure. The search for points in a 3D subspace is reduced, by the DST, to one or more searches in the transformed 1D space. The search is performed by either recursive decomposition of the 3D space indexed by the transform into subspaces, exploiting the transformed space structure, or by direct indexing into the region of interest. The searches over the subspaces generated by recursive decomposition are independent from one another, providing many opportunities for a variety of parallel, DST-enabled search methods. The DST provides a basis for fast and efficient compression of point clouds while avoiding construction and traversal of tree-like data structures.

9 Claims, 5 Drawing Sheets

(56) References Cited

U.S. PATENT DOCUMENTS

| | | | |
|---|---|---|---|
| 2013/0297574 A1* | 11/2013 | Thiyanaratnam | G06T 9/001 707/693 |
| 2016/0117856 A1* | 4/2016 | Chang | G06T 15/00 345/427 |
| 2016/0155264 A1 | 6/2016 | Wei et al. | |
| 2018/0081995 A1* | 3/2018 | Horhammer | G06F 16/283 |

OTHER PUBLICATIONS

De Queiroz, Ricardo, et al., "Compression of 3D Point Clouds Using a Region-Adaptive Hierarchical Transform," IEEE Transactions on Image Processing, vol. 25, No. 8, Aug. 2016, pp. 3947-3956.

He, Lijiang, et al., "Aligning Algorithm of 3D Point Cloud Model Based on Dimensionality Reduction," 2017 2nd International Conference on Multimedia and Image Processing (ICMIP) Mar. 17-19, 2017, pp. 281-285.

International Search Report, dated Jul. 24, 2018.

* cited by examiner

METHODS AND SYSTEMS FOR REAL TIME 3D-SPACE SEARCH AND POINT-CLOUD REGISTRATION USING A DIMENSION-SHUFFLE TRANSFORM

CROSS-REFERENCE TO RELATED APPLICATION

This application claims the benefit of Provisional Application No. 62/478,422, filed Mar. 29, 2017.

TECHNICAL FIELD

The current application is directed to computational transformations, searching, data sampling, and other operations that can achieve significant computational and thermodynamic efficiencies in many problem domains, including point-cloud registration.

BACKGROUND

A point cloud is a 3D data set collected by various sensors, such as light detection-and-ranging "LIDAR" sensors, depth cameras, and others. Point cloud registration iteratively aligns a new frame of a 3D data set with previous aligned frames, referred to as a "map." In many applications, a sensor moves in a 3D space with six degrees of freedom and each new frame relates to a previous frame or to a set of aligned previous frames by a spatial transformation. The registration of a sequence of frames of 3D data set is a process that involves finding the rigid transformations, consisting of translations and rotations, that align the frames in a selected coordinate system.

Point cloud registration has a broad range of applications in areas including computer vision, simultaneous localization and mapping ("SLAM"), robotic move planning, autonomous driving, object recognition, medical imaging, magnetic resonance imaging, virtual and augmented reality, and 3D model construction in remote sensing. Many new applications have become possible, in recent years, due to rapid advances in sensing and computing technologies, as a result of which 3D-data-set registration is becoming an increasingly significant component within many scientific, technological, and commercial applications and fields.

Iterative Closest Point ("ICP") and Iterative Closest Point ("GICP") are widely adopted approaches for point-cloud registration. As suggested by its name, ICP depends on iterative searching of 3D spaces and, indeed, its performance is dominated by the cost of such searches. K-d trees and other tree-based approaches are used to search of closest points, and these tree-based approaches involve expensive tree traversals. Empirical testing has shown that it is unrealistic to perform real-time point-cloud registration with any known tree-based approaches to 3D-space searching.

A point cloud frame is generally compressed by sampling to reduce its cardinality prior to frame alignment in order to decrease processing costs. To ensure that the compression does not result in significant decrease in accuracy, many compression techniques are designed to remove any data points over a threshold number of data points from each 3D voxel of a selected size. Octree has been suggested and used for these compression techniques, which requires a storage space of a size proportional to the product of the ranges of the spatial coordinates in each of the three dimensions and which requires processing times proportional to the logarithm of the size of the octree for each point examined. The aligned point cloud frames, or map, produced by point-cloud registration is stored in a data repository. The data repository is incrementally built up along with the processing of each new frame, and, at the same time, needs to be searched for each point in each frame.

As is well understood by those familiar with science and technology, the computational efficiency of a method or subsystem within a computer system, measured by the number of instructions processed and the amount of memory used to carry out particular tasks, is directly related to thermodynamic efficiency of the computer system, and is a significant real-word, physical characteristic of electromechanical computing systems. The time efficiency of a method or subsystem within a computer system is directly related to the real-world performance of the physical computer system and is often a significant determinant of the practical utility of the computer system in real-world applications. As with any significant component of an application, technology, or system, researchers, designers, developers, manufacturers, and vendors continuously seek more efficient and faster 3D-data-set-registration methods and systems, and seek improved efficiencies in many other, related applications and problem domains.

SUMMARY

The current document is directed to a dimensional shuffle transform ("DST") that maps a 3D space to a one-dimensional space that preserves 3D neighborhoods within 1D neighborhoods within a recursive hierarchical structure. The search for points in a 3D subspace is reduced, by the DST, to one or more searches in the transformed 1D space. The search is performed by either recursive decomposition of the 3D space indexed by the transform into subspaces, exploiting the transformed space structure, or by direct indexing into the region of interest. This approach to searching a 3D space using the DST Transform has been shown, by both theoretical analysis and empirical testing, to be more time-efficient and space-efficient and to provide better performance in recall and precision than currently used approaches based on K-d trees, octal trees, and their many variants. Moreover, the searches over the subspaces generated by recursive decomposition are completely independent from one another, providing many opportunities for a variety of parallel, DST-enabled search methods. The DST provides a basis for fast and efficient compression of point clouds while avoiding construction and traversal of tree-like data structures.

DETAILED DESCRIPTION

Computer Systems

Figure 1:
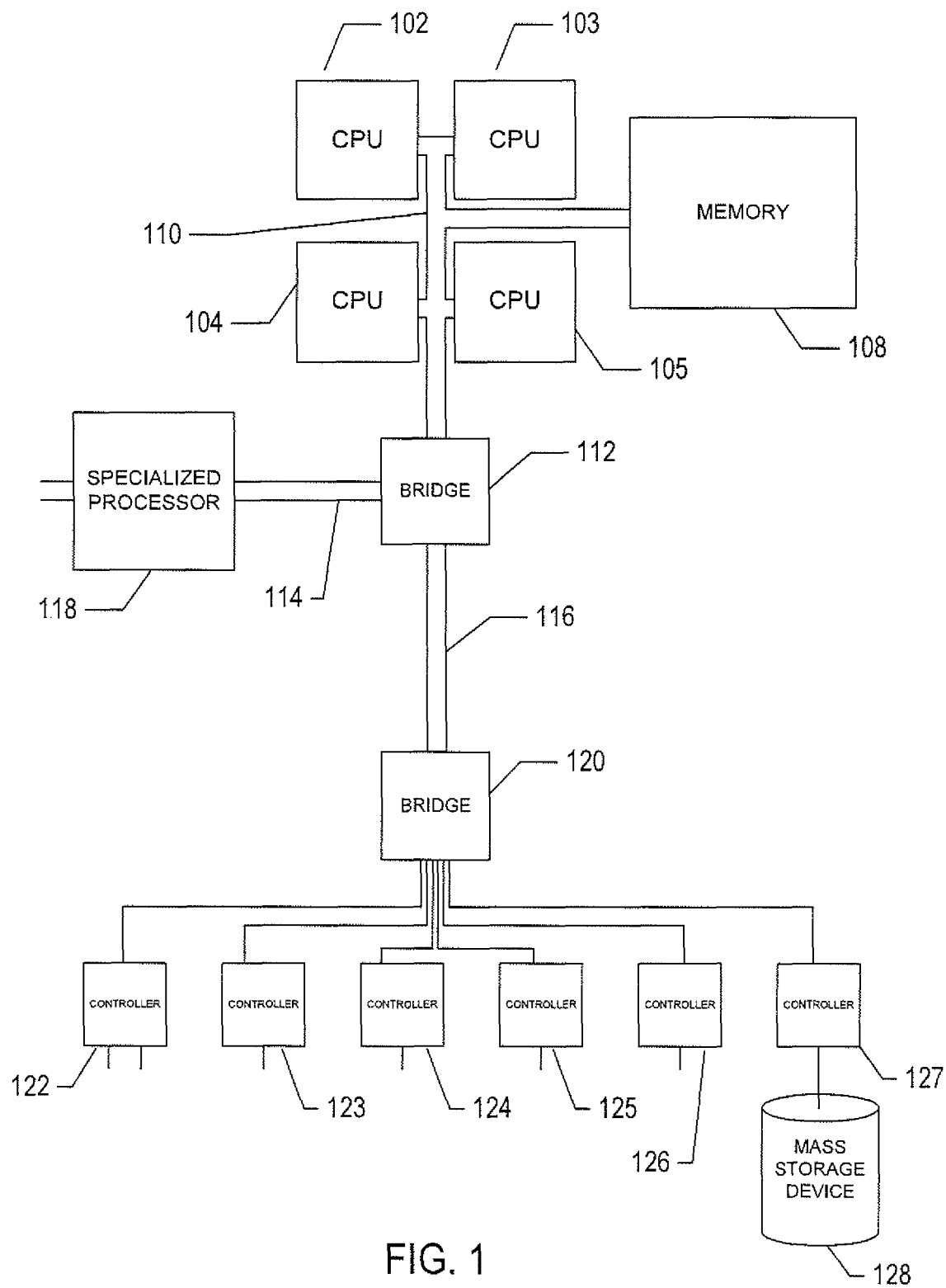
FIG. 1 provides a general architectural diagram for various types of computers.

FIG. 1 provides a general architectural diagram for various types of computers, including certain of to computer systems on which point-cloud-registration systems are implemented. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. Computer systems and higher-level systems implemented on them are physical electromechanical systems that consume energy and transform the physical states of many subcomponents and external systems to which they are connected. Computer systems are controlled by computer instructions stored in physical data-storage devices. The computer instructions are themselves physical entities. Otherwise, they could not be stored and retrieved from data-storage devices.

Notational Conventions and Primitive Objects and Operations

A point p in a discrete 3D space ($D^3$) can be represented by a set of three coordinates (z, y, x), where z, y, x are integers and are respectively referred to as the coordinate of point p along the Z, Y, and X coordinate axes of the 3D space. A point in a 1D space is represented by a single coordinate k along a single axis of the 1D space. The Euclidian metric for distance is assumed for the space unless otherwise specified, although certain of the following discussions may be valid for additional distance metrics, such as the Manhattan distance metric.

Let $p_1=(z_1, y_1, x_1)$ and $p_2=(z_2, y_2, x_2)$ be two points in $D^3$. These two points define a regular region $R(p_1, p_2)$ with a cubic shape:

$R(p_1, p_2)=\{p=(z, y, x)|$
  $\min(z_1, z_2) \leq z \leq \max(z_1, z_2);$
  $\min(y_1, y_2) \leq y \leq \max(y_1, y_2);$
  $\min(x_1, x_2) \leq x \leq \max(x_1, x_2)\}.$ Note that the conditions $z_1 \neq z_2$, $y_1 \neq y_2$, and $x_1 \neq x_2$ are assumed to prevent possible degeneration of the cube to a plane, a line, or a point. A region r' is a sub-region of a region r if and only if, as sets:

$$r' \subset r.$$

The following are operations over binary numbers and integers:

B(x): returns the binary form $b=[b_{m-1}^x, \ldots, b_0^x]$ of integer x,
$B^{-1}$(b): returns x if and only if B(x)=b,
Get(x, j): returns the jth bit of B(x),
Set(x, j, c): sets the jth bit of B(x) to the binary bit c and returns the corresponding integer.

The notations: |, &, and ^ are used to denote, respectively, the bitwise AND, OR, and ExclusiveOR operations of two unsigned integers, while ~ denotes the bitwise complement of an unsigned integer; <<m and >>m denote respectively the left and right shift by m bit positions of an unsigned integer.

The DST Transform

The Dimension Shuffle Transform ("DST") is a mapping from three-dimensional space $D^3$ to one-dimensional space $D^1$, where w is the width, in bits, of a 3D coordinate along a 3D dimension:

```
def H (x, y, z, w)
    k = 0
    ptr = 1
    for i = 0 to w-1
        dx = x & ptr
        x = x >> 1
        dy = (y & ptr) << 1
        y = y >> 1
        dz = (z & ptr) << 2
        z = z >> 1
        ktemp = dx | dy | dz
        ktemp = ktemp << (i * 3)
        k = k | temp
    end
    return k
end.
```

Given a point p in $D^3$, the DST Transform of the point, k=H(p), is also referred to as the key for the point p.

Figure 2:
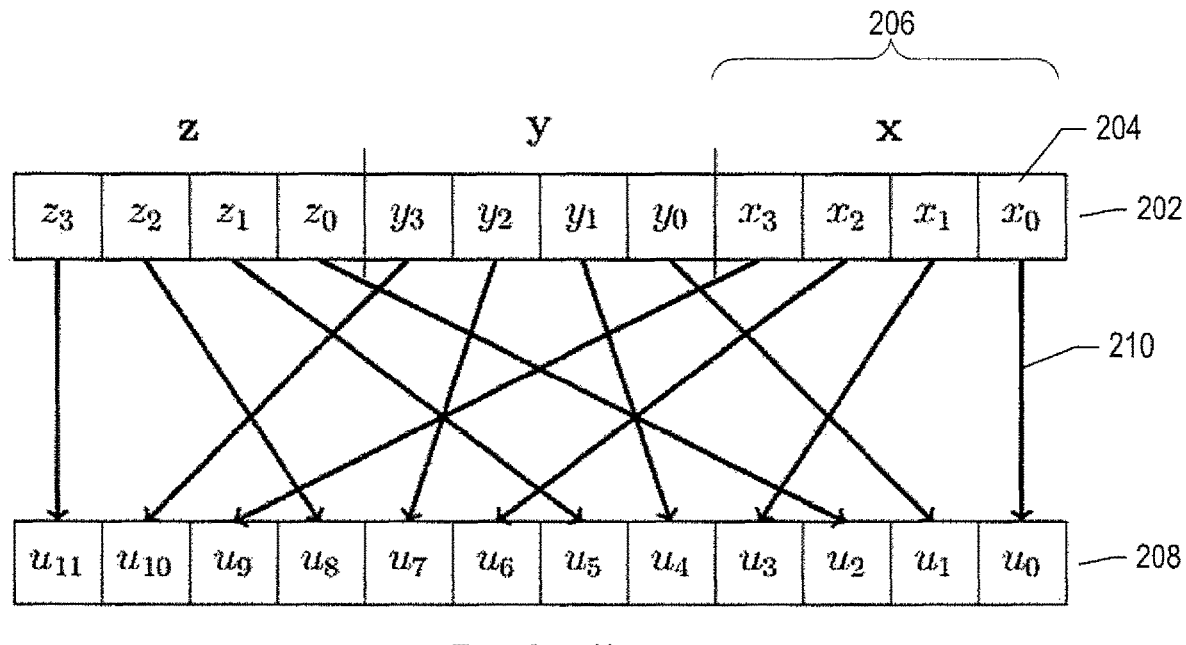
FIG. 2 illustrates the DST Transform.

FIG. 2 illustrates the DST Transform. As shown in FIG. 2, the 3D coordinates for a point p are each encoded in a 4-bit nibble within a 12-bit array of bits 202. The bits that represent each coordinate are arranged in right-to-left order of significance, with the least significant bit of a coordinate representation located at the right-hand end of the nibble. For example, the least-significant bit 204 of the nibble representing the x coordinate 206 is the rightmost bit of the nibble. The DST Transform splays out the bits of the 3D coordinates across a 12-bit representation 208 of the linear coordinate k, as indicated by arrows, such as arrow 210, in FIG. 2. The 12-bit representation 208 of the linear coordinate k can be thought of as a sequence of four three-hit blocks, each three-bit block containing an ordered triple of bits of a particular significance extracted from the corresponding 3D coordinates. The volume of the 3D space includes a number of points equal to the cube of the number of different coordinate values that can be represented by the number of bits used to represent a 3D coordinate. In the example shown in FIG. 2, each nibble can represent 16 different values, and thus the 3D space contains $16^3$=4096 points. The number of points in the one-dimensional transform space is equal to the number of k-coordinate values that can be represented by the number of bits used to represent a 1D coordinate. In the example shown in FIG. 2, 12 bits can represent $2^{12}$=4096 points. As the value v of a coordinate increases, the position of the leftmost 1-valued bit increases in stepwise fashion proportionally to the base-2 logarithm of v. For this reason, splaying 3D-coordinate bits across the k-coordinate representation tends to generate larger values for the k coordinate as the values of the 3D coordinates increase, since larger-valued 3D-coordinates have 1-values bits positioned further towards the left side of the nibble representing the 3D coordinates, which end up positioned even further towards the left side of the k-coordinate representation by the DST Transform.

The DST Transform H is a bijection, and, as such, the inverse transform $H^{-1}$ exists, as follows:

```
def      H⁻¹ (k, w)
         ptr = 1
         ptr2 = 1
         x = y = z = 0
         for i = 0 to (w−1)
             if (k & ptr) x = x | ptr2
             ptr = ptr << 1
             if (k & ptr) y = y | ptr2
             ptr = ptr << 1
             if (k & ptr) z = z | ptr2
             ptr = ptr << 1
             ptr2 = ptr2 << 1
         end
    return (x, y, z)
end
```

The result is returned as the concatenation of the 3D coordinates (x, y, z), in binary.

Figure 3:
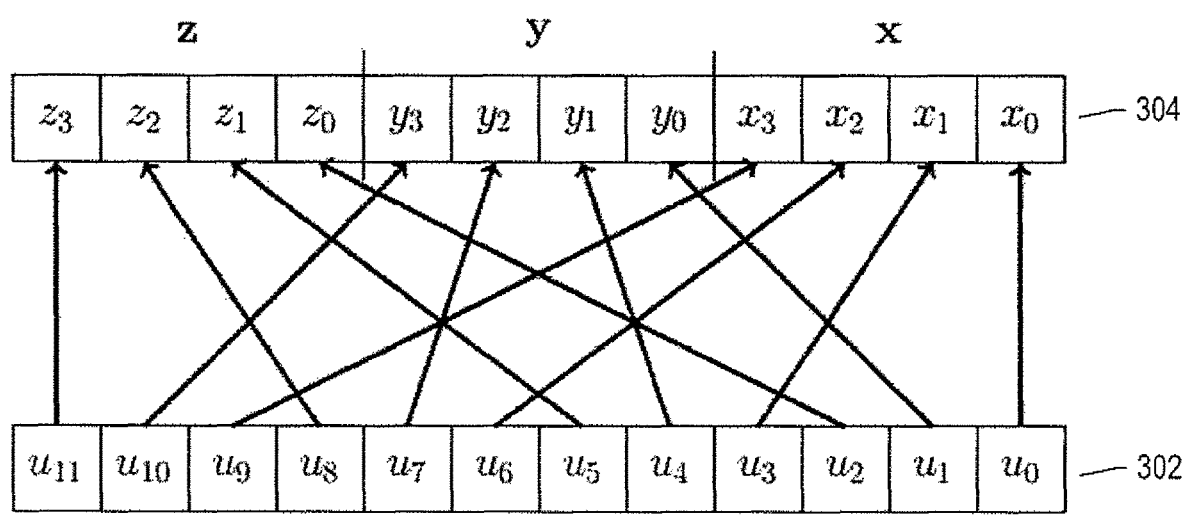
FIG. 3 illustrates the inverse DST Transform $H^{-1}$ using the same illustration conventions previously used in FIG. 1.

FIG. 3 illustrates the inverse DST Transform $H^{-1}$ using the same illustration conventions previously used in FIG. 1. As shown in FIG. 3, bits of the 3D coordinates distributed across the 12-bit representation 302 of the linear coordinate k are collected back into their respective coordinate-representing nibbles in the 4-bit-nibble representation of the concatenated 3D coordinates 304. Clearly, the inverse, or reverse, DST Transform $H^{-1}$ performs a transformation opposite from that performed by the forward DST Transform H, since the only difference between the illustrations shown in FIGS. 2 and 3 is the directions of the arrows representing the corresponding locations of the bits in the linear coordinate k and the bits in the 3D coordinates.

The DST Transform has the property of preserving neighborhoods in that points close to one another in the 3D space tend to be close to one another in the transformed space. Another way of looking at DST Transform is that the DST Transform imposes an implicit hierarchical structure over the 3D space, where a first cube with edges of length $2\alpha$ is divided into eight sub-cubes with edges of length $\alpha$. The division can be recursively performed on the sub-cubes and their sub-cubes until the number of points along each sub-cube edge is less than four. The assertion that DST is a neighborhood preserving transform can then be formally justified by the fact that the DST keys of the all the points in a cube or sub-cube in this hierarchical structure always form a linear set of keys with monotonically increasing values $[s, t]=\{k | s \geq k \geq t\}$ for two integer keys s and t, which will be referred to as the lower front and upper corner of the cube or sub-cube, respectively.

Figure 4:
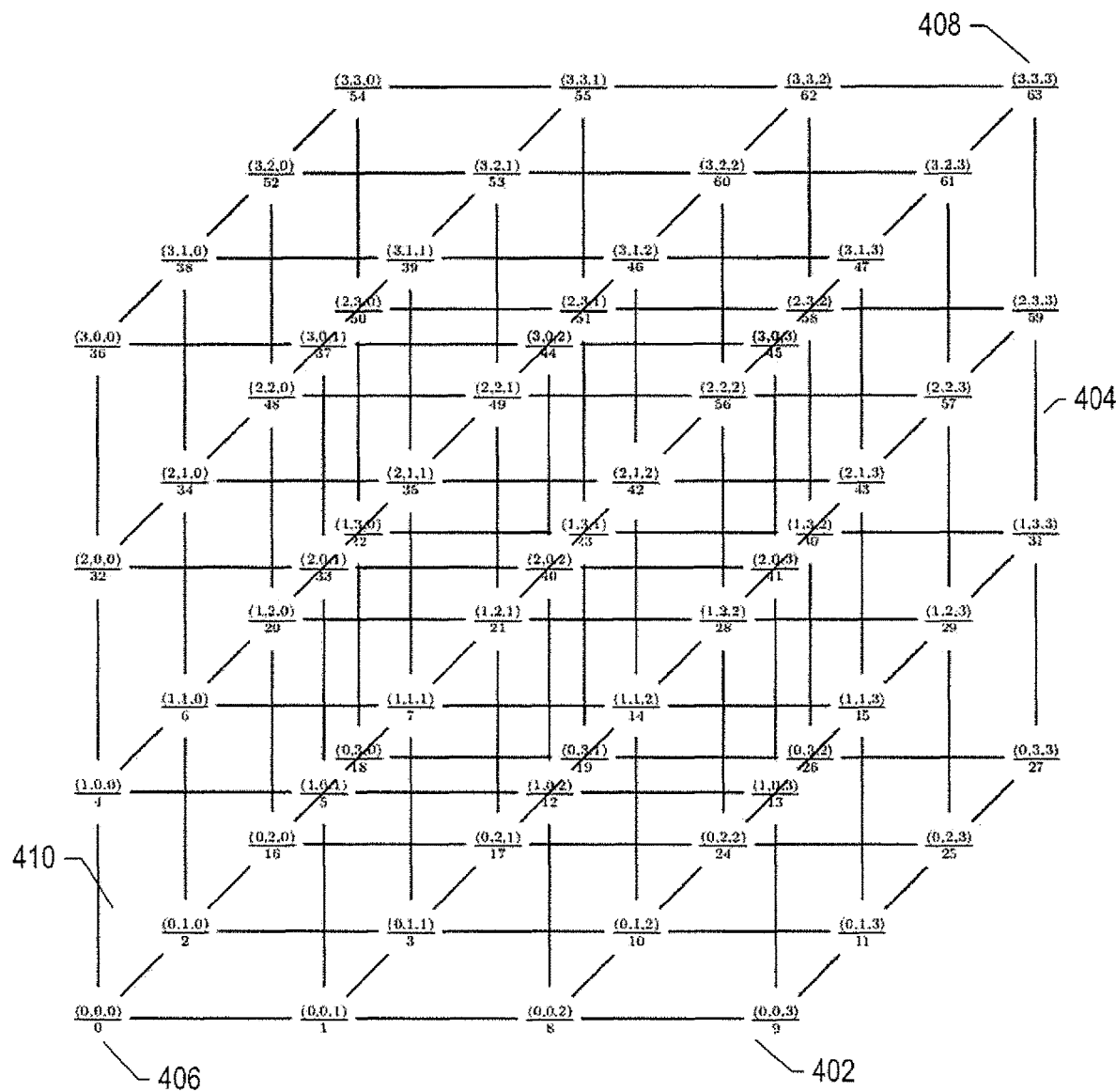
FIG. 4 illustrates a DST mapping between 64 points in a 3D space and their corresponding k coordinates in a corresponding linear DST-transform space.

FIG. 4 illustrates a DST mapping between 64 points in a 3D space and their corresponding k coordinates in a corresponding linear DST-transform space. Each point, such as point 402, is labeled with the point's 3D (z, y, x) coordinates and with the point's corresponding DST-transform-space k coordinate, or key, shown in FIG. 4 as $$\frac{(z, y, x)}{k}.$$

The overall cubic space 404 shown in FIG. 4 includes all the points with 3D coordinates that can each be represented using two bits. The entire space is contained within the cube having the lower, left-hand corner point 406 with 3D/1D coordinates (0, 0, 0)/0 and an upper, right-hand corner point 408 with 3D/1D coordinates (3, 3, 3)/63. There are other, smaller cubes, for which the linear coordinates of the points form a monotonically increasing subset of the linear coordinate axis, such as the small lower left corner cube 410 with points having the 3D coordinates (0, 0, 0), (0, 0, 1), (0, 1, 0), (0, 1, 1), (1, 0, 0), (1, 0, 1), (1, 1, 0), (1, 1, 1) and corresponding linear coordinates 0, 1, 2, 3, 4, 5, 6, and 7. Were the space to include all the points with 3D coordinates that can each be represented using three bits, the cube representing the space would include 512 points and were the space to include all the points with 3D coordinates that can each be represented using four bits, the cube representing the space would include 4096 points.

Regions and Their Properties

Given two keys k and k', the regular region defined by the two keys, denoted by $<k_1, k_2>$, is given by $\{(z, y, x) | \min(x_1, x_2) \leq x \leq \max(x_1, x_2), \min(y_1, y_2) \leq y \leq \max(y_1, y_2), \min(z_1, z_2) \leq z \leq \max(z_1, z_2)\}$, where $(z_1, y_1, x_1) = H^{-1}(k_1)$, $(z_2, y_2, x_2) = H^{-1}(k_2)$. On the other hand, the linear region defined by the two keys, denoted by $[k_1, k_2]$, is given by $\{(z, y, x) | k_1 \leq H(z, y, x) \leq k_2\}$. It can be shown that $<k_1, k_2> \subseteq [k_1, k_2]$ always holds. The precision of a region defined by two keys $(k_1, k_2)$ is $|<k_1, k_2>|/|[k_1, k_2]|$, where $|S|$ denotes the cardinality of a set S. It follows that the precision of a region is always less than or equal to one. A region with precision one is a perfect region and a region with precision one and with the lengths of each edge along all dimensions equal to one another is a perfect cube.

The DST level is a fundamental characteristic of a region, which among other applications, is used in determining dividing planes during region-decomposition operations. It is calculated by the method "Lvl," as follows:

```
def Lvl (k₁, k₂)
    k = k₁ XOR k₂
    level = w − 1
    window = 7 << 3 * (w − 1)
    while ((window & k) == 0)
        window >> 3
        level = level − 1
    end
    return level
end
```

Given two keys $k_1$ and $k_2$, $Lvl(k_1, k_2)$ calculates the level of the regular region $<k_1, k_2>$. In the code shown above, w is the width of each 3D coordinate's binary form, in bits. The routine Lvl partitions the binary bits in k into successive blocks of three bits, and then finds the index of the three-bit block containing the left-most 1-valued bit or bits in k, which represent the most significant bit or bits of the 3D coordinates corresponding to the keys $k_1$ and $k_2$ that differ.

A non-perfect region with a volume greater than the smallest possible volume of a region can be decomposed into sub-regions with better, if not perfect, precisions. The decomposition is done in a way that maximizes the precision. The following method Pat is an auxiliary method used in the determination of an optimal decomposition:

```
def Pat (k₁, k₂, L)
    k = k₁ XOR k₂
    pat = 7
    pat = pat << 3*L
    pat = pat & k
    return pat >> 3*L
end
```

Given two keys $k_1$ and $k_2$ and a pre-calculated level of $\langle k_1, k_2 \rangle$, Pat($k_1$, $k_2$) calculates the pattern of the defined region, subsequently used in the decomposition of the region. The pattern is an integer with a value in the range 1, . . . , 7. The pattern, in its binary form ($b_2$, $b_2$, $b_1$), indicates the dividing axes in a decomposition. A regular region has three sets of parallel edges, each set of edges parallel to a different coordinate axis. Intuitively, the three bits that represent the pattern returned by the routine Pat indicate the set or sets of parallel edges of the region $\langle k_1, k_2 \rangle$ having the greatest length. When there is only one such set of edges, the region is decomposed by dividing the region by a plane perpendicular to the edges in that set. When there are two such sets of edges, the region is decomposed by dividing the region by two planes perpendicular to the two sets of edges with greatest lengths and parallel to the third set of edges with lengths shorter than those of the edges in the two sets. When there are three such sets of edges, the region is decomposed by dividing the region by three mutually perpendicular planes, each parallel to a different coordinate axis.

Figure 5:
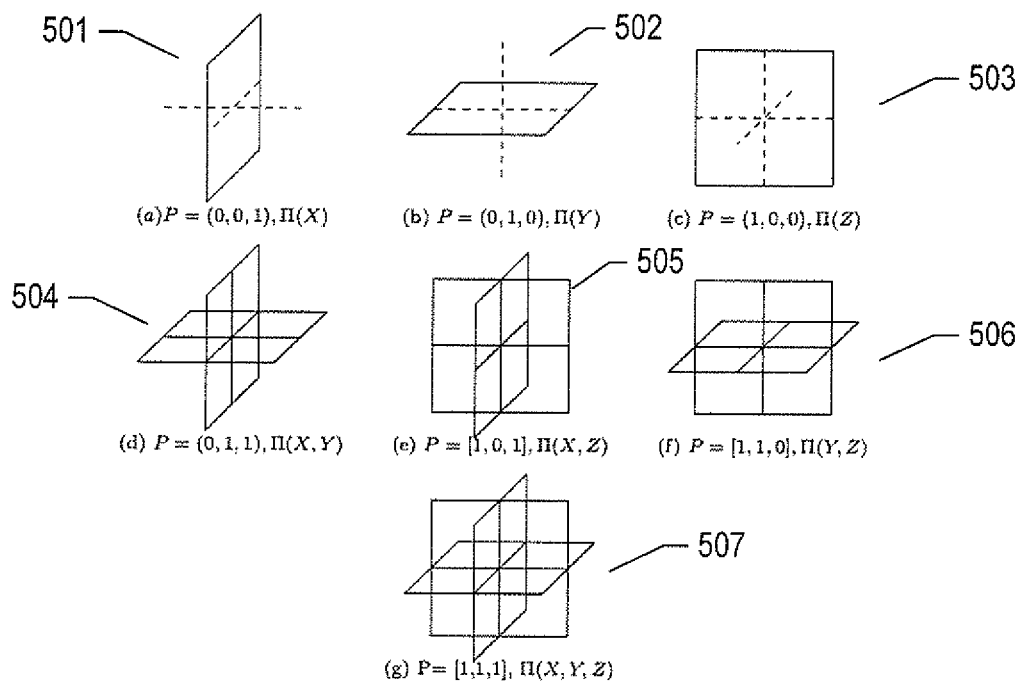
FIG. 5 illustrates the meanings of the seven different possible patterns returned by the method Pat.

FIG. 5 illustrates the meanings of the seven different possible patterns returned by the method Pat. The pattern 001 (501) indicates division by a plane perpendicular to the X axis. The pattern 010 (502) indicates division by a plane perpendicular to the Y axis. The pattern 001 (503) indicates division by a plane perpendicular to the Z axis. The pattern 011 (504) indicates division by two planes, a first plane perpendicular to the X axis and a second plane perpendicular to the Y axis. The pattern 101 (505) indicates division by two planes, a first plane perpendicular to the X axis and a second plane perpendicular to the Z axis. The pattern 110 (506) indicates division by two planes, a first plane perpendicular to the Y axis and a second plane perpendicular to the Z axis. The pattern 111 (507) indicates division by three mutually perpendicular planes, each perpendicular to a different coordinate axis that the coordinate axes to which the other two planes are perpendicular. Of the seven decompositions, three are binary, three are quintenary, and one is octonary.

Decomposition

Two auxiliary methods are used to identify the corners of the perfect region in which a point resides, given a particular level. To partition a region $\langle p_1, p_2 \rangle$ along an axis, two additional points $p_1^2$, and $p_2^1$ are calculated, such that $[p_1, p_1^2] \cup [p_2^1, p_2] = [p_1, p_2]$. It is easy to infer that $p_1^2$ must have the same coordinates as $p_2$ in all axes except the dividing axis. Similarly, $p_2^1$ differs from $p_1$ only in the dividing axis. Given the key of a point and a level, the following method LowerFt calculates the lower front corner of the perfect cube at the given level to which the point belongs. The method LowerFt sets each of the least significant 3*L bits of the key to the bit value 0.

```
def LowerFt(k, L)
    ptr = 1 << 3*L
    rightOnes = ptr − 1
    rightZeros = ~ rightOnes
    return (k & rightZeros)
end
```

Given the key of a point and a level, the method UpperBack calculates the upper back corner of the perfect cube at the given level to which the point belongs:

```
def UpperBk(p, L)
    ptr = 1 << 3*L
    rightOnes = ptr − 1
    return (k | rightOnes)
end
```

Given three keys $k_1$, $k_2$, and $k_3$, the following utility method C returns the concatenated 3D coordinates of a point has the same x coordinate as the 3D point corresponding to $k_1$, the same y coordinate as the 3D point corresponding to $k_2$, and the same z coordinate as the 3D point corresponding to $k_3$, using predefined bit masks XMask=(001001 . . . 001), YMask=(010010 . . . 010), and ZMask=(100100 . . . 100):

```
def C(k1 , k2 ,k3)
    x = XMask & k1
    y = YMask & k2
    z = ZMask & k3
    k = (x | y | z)
    return k
end
```

The m-ary decomposition for a given pattern P is written as $D^P(k_1, k_2) = ((k_1^0, k_2^0), \ldots, (k_{m-1}^0, k_{m-1}^1))$. There are three methods, with names $\Pi^1$, $\Pi^2$, and $\Pi^3$, where the superscript represents one of the three binary patterns 001, 002, and 004, respectively, that carry out an m-ary decomposition of a region $\langle k_1, k_2 \rangle$ of given level L. The method $\Pi^1$ is next provided:

```
def Π1(k1, k2, L)
    ku = UpperBk (k1, L − 1)
    kv = LowerFt (k2, L − 1)
    k3 = C(ku, k2, k2)
    k4 = C(kv, k1, k1)
    return ((k1, k3),(k4, k2))
end
```

The above method performs a binary decomposition of a region along X axis. Similarly constructed methods $\Pi^2$ and $\Pi^4$ perform binary decompositions along the Y and Z axes, respectively.

The method $\Pi^3$ carries out a quaternary decomposition of a region $\langle k_1, k_2 \rangle$ in accordance with pattern 011 (504 in FIG. 5):

```
def Π3 (k1, k2, L)
    ku = UpperBk (k1, L − 1)
    kv = LowerFt (k2, L − 1)
    k12 = C(k1, k1, ku)
    k21 = C(kv, k1, k1)
    k22 = C(kv, k1, k3)
    k31 = C(k1, kv, k1)
    k32 = C(kv, k2, k2)
    k41 = C(kv, kv, k1)
    return ((k1, k12), (k21, k22), (k31, k32), (k41, k2))
end
```

Methods $\Pi^5$ and $\Pi^6$ are similarly constructed. Method $\Pi^7$ performs an octonary decomposition along all axes for the pattern 111 (507 in FIG. 5):

```
def Π7(k1, k2, L)
    ku =UpperBk (k1, L − 1)
    kv =LowerFt (k2, L − 1)
    k21 = C(kv, k1, k1)
```

```
            k_22 = C(k_2, k_u, k_u)
            k_31 = C(k_1, k_v, k_1)
            k_32 = C(k_u, k_2, k_u)
            k_41 = C(k_v, k_v, k_1)
            k_42 = C(k_2, k_2, k_v)
            k_51 = C(k_1, k_1, k_v)
            k_52 = C(k_u, k_u, k_2)
            k_61 = C(k_v, k_u, k_v)
            k_62 = C(k_2, k_u, k_2)
            k_71 = C(k_1, k_v, k_v)
            k_72 = C(k_u, k_2, k_2)
            return
                ((k_1, ku),(k_21, k_22),(k_31, k_32),(k_41, k_42),
                (k_51, k_52),(k_61, k_62),(k_71, k_72,(k_v, k_2))
        end
```

Given a region R that is a non-perfect region defined by two keys $k_1$ and $k_2$, in sub-regions $((k_1^1, k_2^2), \ldots, (k_m^1, k_m^2))$ produced by decomposition of the region by the pattern of $(k_1, k_2)$, $$s_1 = k_2 - k_1 + 1, \text{ and}$$

$$s_2 = \sum_{i=1}^{m} (k_i^2 - k_i^1 + 1),$$

then it is easy to show that $s_2 < s_1$ always holds. It follows that the precision of a non-perfect region is always improved after a DST decomposition. Moreover, DST decompositions have the following properties: (1) any largest perfect region contained in the region is always contained in a sub-region in the result as a whole and will never be partitioned; and (2) there are no other decompositions of the same arity (m) with an overall linear size smaller than $s_2$. In this sense, the DST decompositions are optimal.

Regional Search

The decomposition of a space for a region $<k_1, k_2>$, where $k_1 \leq k_2$, is performed by the following method, which first identifies the pattern of the region and then calls the corresponding decomposition method:

```
def Π (k_1, k_2)
    L = Lvl (k_1, k_2)
    P
= Pat (k_1, k_2, L)
        case P of
                1: d = Π^1(k_1, k_2, L)
                2: d = Π^2(k_1, k_2, L)
                3: d = Π^3(k_1, k_2, L)
                4: d = Π^4(k_1, k_2, L)
                5: d = Π^5(k_1, k_2, L)
                6: d = Π^6(k_1, k_2, L)
                7: d = =Π^7(k_1, k_2, L)
        end
        return d
    end
```

Given that [s, t] is an arbitrary region where $s \leq t$, and $\rho$, a number between 0 and 1, is the desired precision, the following method recursively decomposes the region into sub-regions with precision equal or higher than $\rho$:

```
def Π^R (s, t, ρ)
    Task = ( )
    Results = ( )
    Decs = ( )
    push (Task, (s, t))
    while (NotEmpty(Task))
        (k_1, k_2) = pop Task
        if (Precision (k_1, k_2) ≥ ρ)
            push (Result, (k_1,k_2))
        else
            Decs = Π(k_1, k_2)
            while (NotEmpty (Decs))
                push (Task, pop( Decs ))
            end
        end
    end
    return Result
end
```

The search of a region in 3D space is therefore a recursive process. A subregion is further decomposed if and only if its precision has reached the predefined value. There are other ways to control the recursion. One of them depends on the notion of geometric dimension. Given a regular region $<s, t>$, and its longest edge along all dimensions l, the regular region has a geometric level of $[\log_2(l)]$. It is easy to verify that the geometric and DST levels are equal for a perfect cube for any level, and generally the former is always smaller or equal to the latter for any region. The difference between the two levels of a region is thus an indicator to how close the region is to a perfect cube, and as such it can be used to replace the precision $\rho$ in method $\Pi^R$. No matter how the value of precision or level difference is chosen, method $\Pi^R$ always yields a result with 100% recall. The freedom of setting different stopping thresholds for the recursive divide-and-conquer process allows a trade-off between the precision and computing speed, which can be easily exploited.

Neighborhood Examination

Figure 6:
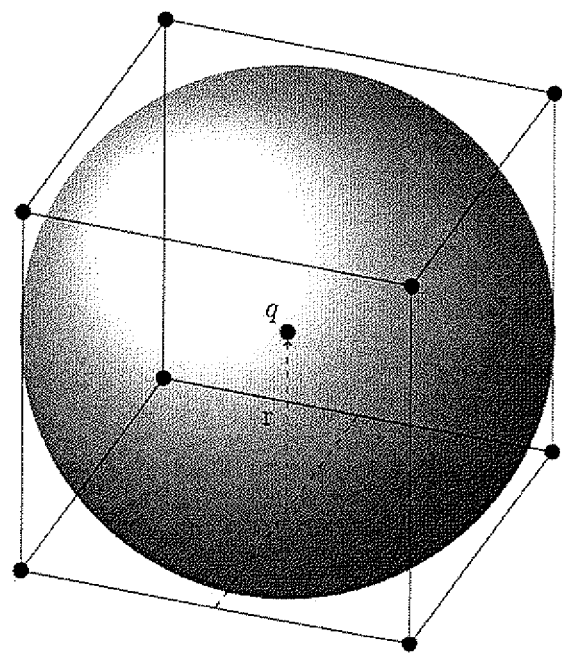
FIG. 6 shows a spherical neighborhood R with radius r circumscribed within a cube with edge length of 2r.

FIG. 6 shows a spherical neighborhood R with radius r circumscribed within a cube with edge length of 2r. Given that $S=(p_{n-1}, p_0)$ is a set of points in a 3D space, the spherical neighborhood, with radius r, of reference point $q=(z_q, y_q, x_q)$ is the set:

$$Nbr_s(S,q,r)=\{p|p \in S, \text{Dist}(p,q) \leq r\}.$$

On the other hand, the cubical neighborhood of reference point q in the same space refers to:

$$Nbr_c(S,q,r)\{p|p=(z_p,y_p,x_p) \in S,$$

$$z_p-z_q \leq r|y_p-y_q| \leq r|x_p-x_q| \leq r\}.$$

Given a region R in a space, a set of points U in the region R, and a set of points V returned by a search, then the recall of the search is given by $$\text{recall} = \frac{|U \cap V|}{|U|},$$

while the precision of the search is given by $$\text{precision} = \frac{|U \cap V|}{|V|}$$

This two metrics are used to measure the performance of a search in terms its completeness and precision respectively. Their values are always a number between 0 and 1, by definition.

A neighborhood examination over the 3D data set S starts with the DST Transform H that maps each point p in S to a point in a one-dimensional space and puts the ensemble in a repository Repo, which supports two operations: Put (Repo, k), and Get (Repo, s, t). The former deposits the one-dimensional key in the Repo, and the latter returns all the points with the keys with values between s and t. Various different types of repositories are employed in alternative implementations, from particular in-memory data structures, data-structures that span memory and mass-data-storage devices, to database management systems. The method Φ maps a set of points using the transform H and put the results into a Repo, where w is the width of the binary form for the coordinates along each dimension of the 3D space:

```
def Φ(S, w)
    Repo = ( )
    for each p in S
        put (Repo, H (s, w))
    end
    return Repo
end
```

The following method NBR_c computes the neighborhood $Nbr_c(S, q, r)$, with a recall of one and a precision ρ between 0 and 1, that a user can choose properly according to the circumstances of the application, with the operation Put(Repo, k) storing the point p with the key k=H(p) in the Repo while the operation Get(Repo, s, t) retrieves all the points with keys in the closed section of [s, t]:

```
def NBR_c (S, q, r, ρ, w, cubic?)
    Result = ( )
    Repo = Φ (S, w)
    Segs = Π^R (H(z-r, y-r, z-r), H (z+r, y+r, x+r), ρ )
    for each (s, t) in Seqs
        K = Get (Repo, s, t)
        for each k in K
            p = H^-1 (k, w)
            if (cubic?)
                push (Result, p)
            else
                if (Dist (p, q) ≤ r)
                    push (Result, p)
                end
            end
        end
    end
    return Result
end
```

In the above method, $S=\{p_{n-1}, p_0\}$ is a set of points in a 3D space, q is the reference point, r is the radius of the neighborhood, ρ is Method ∪. The argument cubic? is a Boolean argument that indicates whether the desired neighborhood is cubic or spherical.

Both cubic and spherical neighborhood examination has a recall of 100%. In other words, any point in the region will turn out in the result. The precision of the cubic neighborhood can be controlled by the parameter of ρ, which can take any desired value between 0 and 1. A spherical neighborhood can be approximated by the circumscribing cubic neighborhood, if so desired, which yields an expected precision of 52.3598%, assuming uniform distribution of the points in the space.

In many problems, it is often desired to find the k nearest neighbors for a given point, particularly for the case k=1. The method $Nbr_k$ uses method NBR_c to determine the nearest k neighbors for a given point q in the space S:

```
def Nbr_k (S, q, r, ρ, w, cubic?)
    Result = Nbr_c(S, q, r, ρ, w, True)
    sort Result
    return (Result, 0, k-1)
end
```

For a small neighborhood, Result is generally a small set, hence the cost of sorting is generally low. An alternative to sorting is to maintain the Result structure as an ordered list. The nearest k points can then immediately be found without further sorting.

Figure 7:
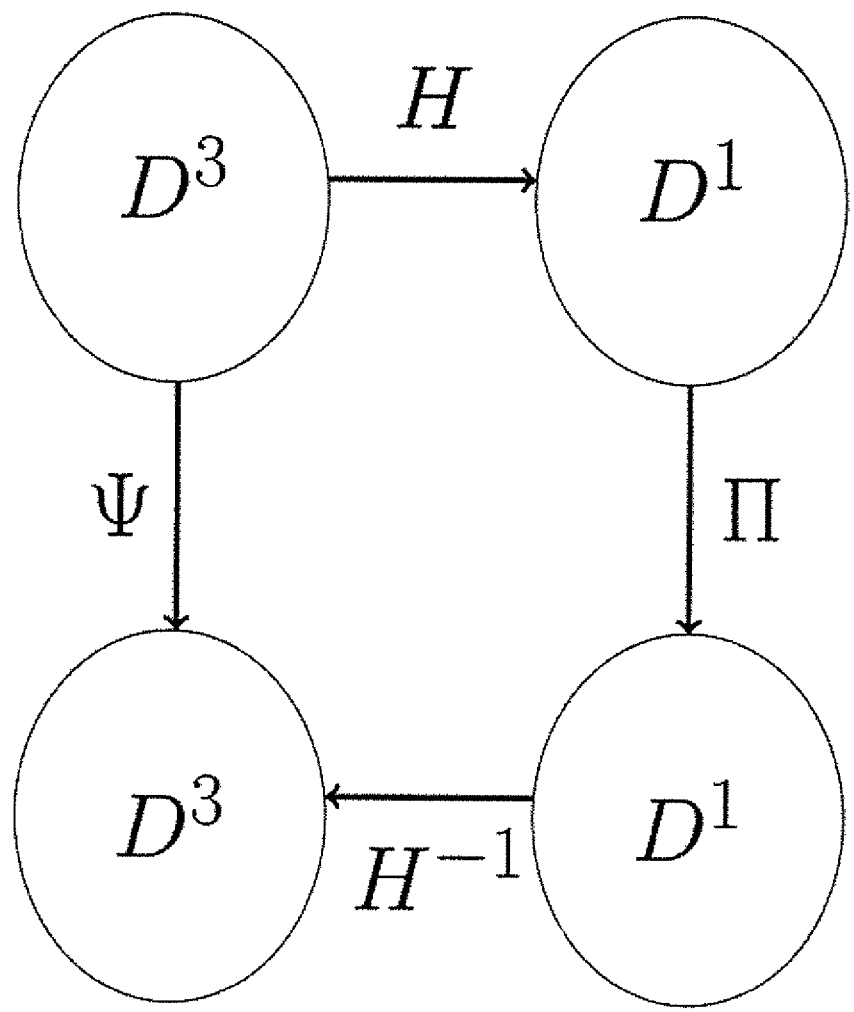
FIG. 7 provides and illustration of the current H-and-$H^{-}_1$-transformation based approach.

Neighborhood examination in 3D space has been mostly performed directly over the space, using methods, denoted Ψ, that are often based on K-d trees. The current methods differ from the conventional approaches in that it uses a transform, written H, to reduce the problem into a problem in the domain of one-dimensional space with special properties. The neighborhood examination is then performed in the transformed domain with the Π method. The results are then transformed back to 3D domain with the $H^{-1}$, the inverse of Φ. In functional notation, the methods in this embodiment can be concisely summarized as $Ψ=H^{-1}·Π·H$. FIG. 7 provides and illustration of the current H-and-$H^{-1}$-transformation based approach.

Finally, a search method for the nearest neighbor or neighbors of a point by searching the perfect cube of a certain level to which point ρ resides is provided:

```
def Nbr_cube(p, L_c)
    k = DST (p)
    s = LowerFront (k, L_c)
    t = UpperBack(k, L_c)
    neighbors = Get (Repo, s, t)
end
```

Assuming the DST level of the perfect cube calculated from a desired diameter is $L_c$, this method ensures that all points within the perfect cube of level $L_c$ to which point ρ belongs are searched. While the search within the perfect cube has 100% recall, some points which might be closer to the point p than those in the result might not be included. This occurs when the point p resides near the edges or corners of the cube. The impact of this inaccuracy to the precision of the final map is often practically undetectable.

Point Cloud Sampling

The purpose of point cloud sampling is to reduce the cardinality of the data set. This procedure is generally applied to every new frame of data to reduce the cost of computation. Existing methods include: (1) removing every k-th point from the input with respect to some ordering of the data points; and (2) using an octree to filter out all but one point in each octree cell.

The space can be scaled to keep zero or one point in every perfect cube of level $L_s$ in the DST-transformed space. The following point-cloud-sampling method carries out this compression:

```
def Samp (p, L_c)
    k = DST (p)
    s = LowerFront (k, L_c)
    t = UpperBack(k, L_c)
    if (!Get (Repo, s, t))
        push (Repo, k)
    return
end
```

The sub-region defined by keys s and t is always a perfect cube; therefore, this procedure never involves region decomposition. In effect, in fractionality, this is equivalent to the sampling by octree. The difference is that the above method requires neither the construction of an octree nor any tree traversals. Even though developed for difference purposes, the above two methods share the basic approach of searching in a perfect cube of a certain level. A point cloud with negative and/or decimal coordinates can always be shifted and scaled so that all coordinates are positive and integral prior to applying the currently disclosed methods.

The point-cloud sampling methods, discussed above, provides orders of magnitude improvement in the computational efficiency of point-cloud-registration systems. As discussed above, this represents an enormous improvement in these types of computing systems, both from the standpoint of energy consumption, memory-resource consumption, and real-time performance, moving point-cloud registration from the prototype and research realms into the realm of practical, commercially feasible systems underlying autonomous vehicles and other such real-world applications. The DTS transform, along with the decomposition methods discussed above, can be usefully applied in many problem domains, just as Fourier transforms are used throughout science and technology, from image and signal processing to quantum mechanics and molecular-structure determination.

The invention claimed is:

1. A system that finds the nearest neighbors of a point in a three-dimensional data set in which each point in a set of points is represented by three coordinates and may be associated with one or more data values, the system comprising:
a computer system having one or more processors and one or more memories;
a dimensional shuffle transform ("DST") component that transforms the three-dimensional data set into a neighborhood-preserving one-dimensional data set in which each point is associated with a key,
a key k corresponding to a given three-dimensional point p is obtained by the forward DST $k=H(p)$, and
the three-dimensional point p corresponding to the key k is obtained by the reverse DST $p=H^{-1}(k)$;
computer instructions, stored in one or more of the one or more memories that, when executed by one or more of the one or more processors, control the system to
receive a radius r and a three-dimensional point p;
determine a set S of one-dimensional points within a perfect cube, each edge of which has length 2r, that contains $k=H(p)$;
determine a result set R as the three-dimensional points corresponding to the one-dimensional points in S within a distance r of p; and
storing the set of three-dimensional points R for one or more of
transmission of R to a requesting entity, and
use of R in downstream methods, including point-cloud registration.

2. The system of claim 1 further including sorting the three-dimensional points in the set R by distance from three-dimensional point p.

3. The system of claim 1 further including retaining, in set R, a specified number of three-dimensional points closest to three-dimensional point p.

4. The system of claim 1 wherein the DST component transforms the three-dimensional data set into a neighborhood-preserving one-dimensional data set by:
retrieving a digital representation of each three-dimensional point of the three-dimensional data,
generating a corresponding digital representation of a one-dimensional point for each three-dimensional point by
for each three-dimensional point,
for each digital representation of each three-dimensional-coordinate value of the three-dimensional point,
for each bit in the digital representation of the three-dimensional-coordinate value,
set a corresponding bit in a digital representation of a corresponding one-dimensional point to the value of the bit in the digital representation of the three-dimensional-coordinate value.

5. The system of claim 4 wherein the three-dimensional points in the three-dimensional data set are positioned within a three-dimensional space represented by a cube with three mutually perpendicular edges that meet at a single point representing three Cartesian coordinate axes, the number of increments along each coordinate axis equal to 2 raised to a power equal to the number of sequential bits used to represent each three-dimensional coordinate value in the digital representations of the three-dimensional-coordinate values within the digital representations of the three-dimensional points.

6. The system of claim 5 wherein the three-dimensional points within the cube can be recursively partitioned into sub-cubes, the three-dimensional points in each sub-cube corresponding to a sequence of one-dimensional points in the neighborhood-preserving one-dimensional data with monotonically increasing one-dimensional coordinate values.

7. The system of claim 6
wherein the digital representations of each three-dimensional-coordinate value of a digital representation of a three-dimensional point comprises an ordered, indexed set of three coordinate-value bit blocks with indices 0, 1, and 2;
wherein each coordinate-value bit block is an ordered set of n bits with indices 0, . . . , n−1, and
wherein the digital representation of the one-dimensional point of each three-dimensional point comprises an ordered set of n three-bit blocks with indices 0, . . . , n−1;
wherein each three-bit block is an ordered set of three bits with indices 0, 1, and 2;
wherein the bit at index i in coordinate-value bit block j in a digital representation of a three-dimensional point corresponds to the bit with index j in the three-bit block at index i in the digital representation of a corresponding one-dimensional point.

8. A method that finds the nearest neighbors of a point in a three-dimensional data set in which each point in a set of points is represented by three coordinates and is associated with one or more data values, the method comprising:
transforming, by a dimensional shuffle transform ("DST"), the three-dimensional data set into a neighborhood-preserving one-dimensional data set in which each point is associated with a key,
a key k corresponding to a given three-dimensional point p is obtained by the forward DST $k=H(p)$, and
the three-dimensional point p corresponding to the key k is obtained by the reverse DST $p=H^{-1}(k)$;

receiving a radius r and a three-dimensional point p;
determining a set S of one-dimensional points within a perfect cube, each edge of which has length 2r, that contains k=H(p);
determining a result set R as the three-dimensional points corresponding to the one-dimensional points in S within a distance r of p; and
storing the set of three-dimensional points R for one or more of
  transmission of R to a requesting entity, and
  use of R in downstream methods, including point-cloud registration.

9. A method that selects a representative set of three-dimensional points from a three-dimensional data set in which each point in a set of points is represented by three coordinates and may be associated with one or more data values, the method comprising:
  transforming, by a dimensional shuffle transform ("DST"), the three-dimensional data set into a neighborhood-preserving one-dimensional data set in which each point is associated with a key,
    a key k corresponding to a given three-dimensional point p is obtained by the forward DST $k=H(p)$, and the three-dimensional point p corresponding to the key k is obtained by the reverse DST $p=H^{-1}(k)$; and
  determining a set R of three-dimensional points by selecting at most one one-dimensional point from each perfect cube of a predetermined level within the neighborhood-preserving one-dimensional data set and transforming the selected one-dimensional points back to three-dimensional points using the reverse DST.

* * * * *